R. BRUNSON.
AIRCRAFT CONSTRUCTION.
APPLICATION FILED OCT. 18, 1917.
1,272,373.
Patented July 16, 1918.
2 SHEETS—SHEET 1.
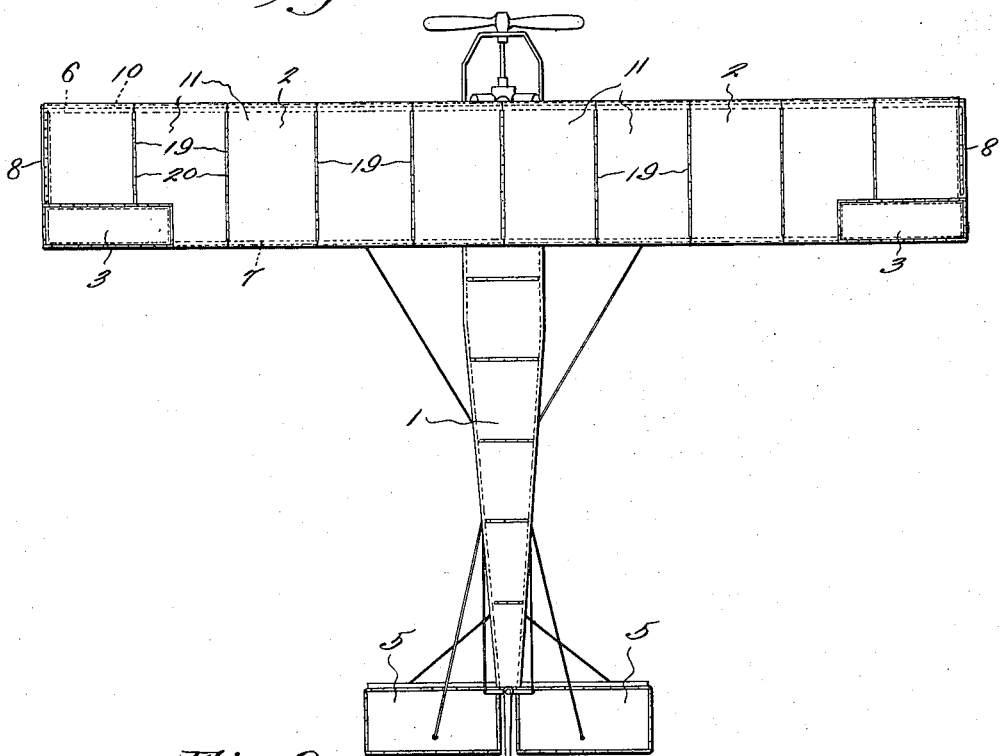
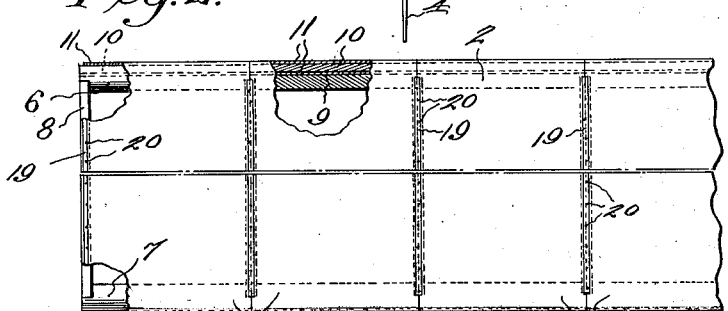
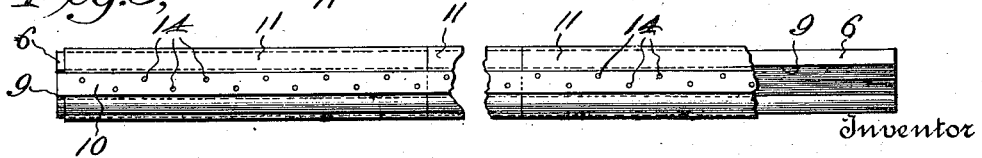
Witnesses
Inventor
Randolph Brunson,
By Victor J. Evans
Attorney R. BRUNSON.
AIRCRAFT CONSTRUCTION.
APPLICATION FILED OCT. 18, 1917.
1,272,373.
Patented July 16, 1918.
2 SHEETS—SHEET 2.
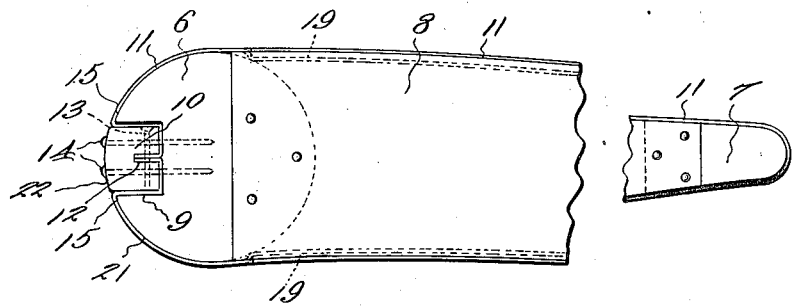
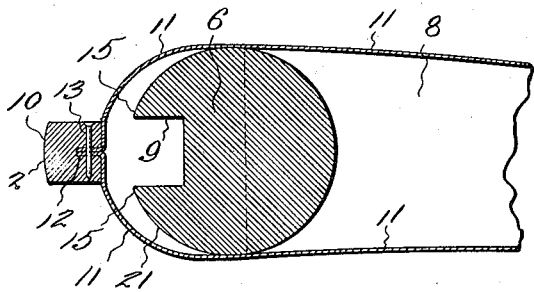
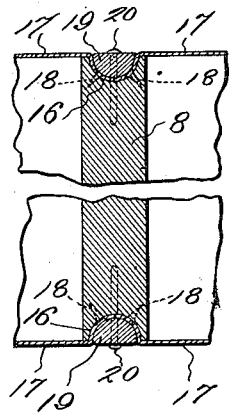
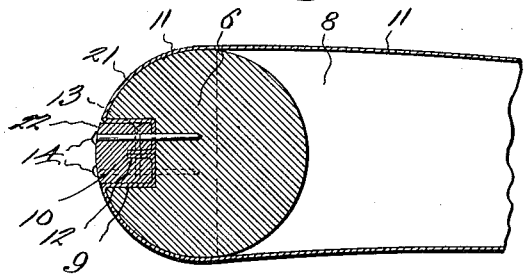
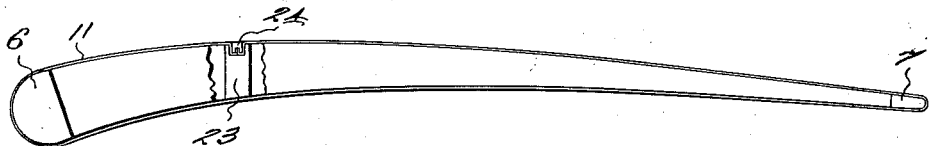
Witnesses
Inventor
Randolph Brunson,
By Victor J. Evans
Attorney

UNITED STATES PATENT OFFICE.

RANDOLPH BRUNSON, OF EAST ORANGE, NEW JERSEY.

AIRCRAFT CONSTRUCTION.

1,272,373.   Specification of Letters Patent.   Patented July 16, 1918.

Application filed October 18, 1917. Serial No. 197,283.

*To all whom it may concern:*

Be it known that I, RANDOLPH BRUNSON, a citizen of the United States, residing at East Orange, in the county of Essex and State of New Jersey, have invented new and useful Improvements in Aircraft Constructions, of which the following is a specification.

This invention relates to aircraft construction and particularly to the means for applying wing covering material to the wing structures, the principle of the invention being also applicable to all covered surfaces of aircraft such as the fuselage, vertical and horizontal rudders, ailerons or other lateral stabilizing surfaces. The object of the invention is to provide means for applying and securing in place the fabric for covering such aircraft surfaces, at the same time effectively stretching the fabric and eliminating the great number of fastening devices now commonly employed, while at the same time enabling new sections of fabric to be substituted for injured sections with a minimum amount of labor and in a comparatively short period of time.

With the above and other objects in view, the invention consists in the novel construction, combination and arrangement of parts, herein fully described, illustrated and claimed.

In the accompanying drawings:—

Figure 1 is a plan view of a flying machine showing the surfaces to which the present invention is applicable.

Fig. 2 is a fragmentary plan view of one of the planes of an aircraft.

Fig. 3 is an end elevation thereof.

Fig. 4 is a fragmentary view looking toward the leading edge of the plane.

Fig. 5 is a fragmentary section on an enlarged scale showing one step in applying and stretching the fabric.

Fig. 6 is a similar view showing the fabric fully applied.

Fig. 7 is a fragmentary vertical transverse section through one of the ribs showing the means for securing adjacent edges of sections of the fabric.

Fig. 8 is a view looking toward the end of a plane showing a different location of the fabric fastening means.

Referring to the drawings 1 designates the body or fuselage of a flying machine, 2 one of the planes or wing surfaces thereof, 3 the ailerons, 4 the vertical rudder and 5 the horizontal rudder. The means for fastening the fabric to each of said surfaces and any other surfaces or planes which may form a part of the complete machine will be described in connection with one of the planes or wings of the machine, such description answering for each and all of the planes or other surfaces employed to produce a complete machine.

Referring now to Figs. 2 to 8 both inclusive, 6 designates the front or leading spar of a wing structure, 7 the rear or trailing spar thereof and 8 the ribs which, in the ordinary construction extend from the front to the rear spars. In carrying out the present invention, in the preferred embodiment thereof, the front spar 6 is formed in the exposed face thereof with a longitudinal groove or gutter 9 adapted to receive a fabric retaining and stretching strip 10 of any suitable material. The fabric is made in sections 11, preferably of sufficient length to extend over the top of the wing structure and under the bottom thereof and the edges thereof are primarily inserted in a slit or kerf 12 formed in the inner face of the strip 10. Fasteners 13 such as nails or brads are driven transversely through the strip 10 and through the edges of the fabric section 11. Thus what may be termed a sleeve formed of fabric is provided which may be readily slipped over either end of the wing structure so as to assume the relation thereto illustrated in Fig. 5. The strip 10, carrying the edges of the fabric section 11 is then inserted and pressed firmly into the groove or channel 9 until it assumes the position shown in Fig. 6. Then other fasteners 14 such as nails or brads are driven through the outer face of the strip 10 and into the spar 6 thereby fastening the strip 10 in place. During the operation of pressing the strip 10 into the groove 9, the fabric is drawn tightly around the rounded corners 15 at the entrance of the groove 9 and stretched tightly over the wing structure.

The fabric sections 11 are of the proper width to meet along the longitudinal centers of certain ribs 8 and said ribs are formed in their top and bottom faces with grooves or channels 16 which are preferably of half round formation in cross section as shown in Fig. 7. The edges 17 of the fabric are pressed into the groove 16 and a few fasteners 18 such as tacks, nails or brads are driven through such edges of the fabric into the rib. Then a retaining strip 19 of any suitable material and corresponding in shape in cross section with the groove 16 is pressed into place therein and secured by fasteners 20 which may also consist of tacks, nails or brads. By means of the construction just described, the plane or wing presents a flush surface where the edges 17 of the fabric are fastened to the rib. Where the spar 6 has a rounded face 21, the outer face 22 of the strip 10 will be correspondingly rounded. As a result of the construction described, a practically even, flush and unbroken surface is provided at all places where the fabric is fastened to the frame structure.

While I have hereinabove described the fabric sections as having their edges fastened to the front spar 6, the same expedient may be used at other places for securing the edges of the fabric sections. For example where heavier intermediate spars are used in plane or wing construction as shown in Fig. 8, the fabric fastening means may be used in conjunction with one of such intermediate spars 23, the retaining and stretching strip 24 corresponding with the strip 10 hereinabove described, being inserted in a corresponding groove in one of the exposed faces of said spar 23.

In view of the foregoing description taken in connection with the accompanying drawings it is to be understood that I do not wish to be restricted to any particular location of the retaining and stretching strips or to any number of said strips to be employed. Ordinarily one of the strips 10 will be used in connection with each fabric section. It is to be understood also that the principle hereinabove described of fastening and stretching the fabric, is equally as applicable to any supporting or controlling surface of any type of aircraft as well as to the body and any other parts of the machine to which a fabric covering is applied.

I claim:—

1. In combination with an aircraft frame structure, a flexible covering extending around and inclosing the same, one member of the frame structure being formed with a longitudinal groove, the opposite edges of the covering lying in said groove, and a retaining and stretching strip for said covering inserted flush in said groove and serving to hold the edges of the covering therein, said opposite edges of the covering being connected before said covering is applied to the frame structure.

2. In combination with an aircraft frame structure in which one of the frame members thereof is formed with a groove in its exposed face, a flexible covering extending over and inclosing said frame, and a retaining and stretching strip to which the edges of the covering are primarily attached before stretching said covering, said strip being adapted to be inserted in said groove to stretch and fasten the edges of the covering in said groove.

3. In combination with an aircraft frame structure in which one of the frame members thereof is formed with a longitudinal groove, a flexible covering for opposite sides of said frame, a retaining and stretching strip insertible in said groove, said strip being formed in its inner face with a kerf in which the edges of the covering are inserted and fastened preparatory to inserting said strip in said groove.

4. In combination with an aircraft frame structure in which one of the frame members thereof is formed with a longitudinal groove, a sleeve of covering material adapted to be slipped over said frame structure, said sleeve embodying a strip to which the edges of the covering material are primarily fastened before stretching said covering, said strip being adapted to be pressed into said groove.

In testimony whereof I affix my signature.

RANDOLPH BRUNSON.